United States Patent Office 2,930,713
Patented Mar. 29, 1960

2,930,713

VITREOUS ENAMEL FRIT

Lewis C. Hoffman, Scotch Plains, N.J., assignor to E. I. du Pont de Nemours and Company, Wilmington, Del., a corporation of Delaware No Drawing. Application February 5, 1959
Serial No. 791,291

8 Claims. (Cl. 117—70)

This invention relates to a new and improved vitreous enamel frit. More particularly, it relates to a low temperature maturing enamel frit suitable for use in the enamelling of steel.

Most commercial enamel frits for steel require firing at 1500° F. In recent years attempts have been made to develop frit compositions that may be fired at lower temperatures, but the properties of these frits have not been satisfactory for commercial practice. The frits of the present invention have overcome the deficiencies of previously developed low temperature firing steel enamels.

Firing of vitreous enamel frits at a temperature under 1100° F. will avoid sagging of steel allowing the use of thinner gage metal. The oxidation of the steel is considerably reduced avoiding the necessity of thick enamel coatings to dissolve the oxide formed. No hydrogen is evolved during firing and the problems of "blistering" and "reboiling" are avoided. The use of thin enamel coatings permits greater flexibility and impact without damage to the enamel. Moisture in the enamel frit slips does not react with carbon at low temperature thus minimizing gas evolving reactions so often observed and allowing the use of steel with higher carbon content than is possible with high temperature maturing enamels.

It is therefore an object of this invention to provide a low temperature maturing frit suitable for use in the enamelling of steel and iron.

It is a further object of this invention to provide a new type of steel enamel.

It is another object of this invention to provide a steel enamel frit which may be applied to iron or steel and fired at a temperature between 490 and 690° C. to produce a satisfactory vitreous enamel coating.

Other objects of the invention will appear hereinafter.

In order that the objects of this invention may be accomplished and in order that the enamel coatings adhere tightly to iron or steel which, in general, has a linear coefficient of thermal expansion between 120 and $140 \times 10^{-7}$, the frit composition must contain the following ingredients in certain ranges and proportions as follows:

The ground coat should contain the following constituents in the ranges and proportions,

|  | Mol percent |
|---|---|
| $SiO_2$ | 27–30 |
| $B_2O_3$ | 22–28 |
| $TiO_2$ | 7–12 |
| $Na_2O$ | 16–23 |
| $K_2O$ | 0.5–3 |
| $Li_2O$ | 5–12 |
| BaO | 0–4 |
| $Sb_2O_3$ | 0–1 |
| CoO | 0–2 |
| NiO | 0–1 |
| $MnO_2$ | 0–1 |
| PbO | 0–2 |
| $F_2$ | 0–5 |

The ratio $$\frac{SiO_2 + 2TiO_2}{R_2O + PbO} \text{ (in mol percent)} = 1.4 \text{ to } 1.9$$

and the sum of $B_2O_3$, $R_2O$, PbO and $F_2 = 52\text{–}58$ mol percent.

The cover coat should contain the following constituents in the ranges and proportions,

|  | Mol percent |
|---|---|
| $SiO_2$ | 23–32 |
| $B_2O_3$ | 7–23 |
| $TiO_2$ | 13–22 |
| $Na_2O$ | 15–22 |
| $K_2O$ | 1–7 |
| $Li_2O$ | 8–12 |
| BaO | 0–6 |
| $Sb_2O_3$ | 0–1 |
| ZnO | 0–5 |
| PbO | 0–5 |
| CdO | 0–2 |
| $F_2$ | 0–6 |

The ratio $$\frac{SiO_2 + 2TiO_2}{R_2O + PbO} \text{ (in mol percent)} = 1.4 \text{ to } 2.3$$

and the sum of $B_2O_3$, $R_2O$, PbO and $F_2 = 46\text{–}60$ mol percent.

Throughout the specification and claims, the term "$R_2O$" refers to alkali metal oxide, $Na_2O$, $K_2O$, or $Li_2O$.

The ground coat of this invention may be covered by other cover coats than those herein specified and the cover coats of this invention may be placed on other ground coats to good advantage, however, it is preferred, in order to obtain optimum results to use both the ground and cover coats of this invention in the enamelling of iron or steel.

The specific ranges and proportions of the constituents of the enamel frits of this invention permit the use of relatively high alkali content and relatively low silica content in comparison to former steel enamels and thus obtain lower firing temperature enamels having equal chemical resistance or better chemical resistance at equal firing temperature. The frits of this invention are particularly advantageous for use on enameler's iron, cast iron, ordinary cold rolled or hot rolled steel and wrought iron, which ferrous materials have a linear expansion coefficient of between 120 and $140 \times 10^{-7}$.

Two types of frit are generally required for the enamelling of iron and steel.

Ground or base coat frits had to have slightly lower or matching linear thermal expansion coefficients to the substrate metal to prevent cracking on cooling after firing; a wide maturing temperature range because they are commonly subjected to one or more than one firing and small amounts of melted in CoO, NiO, and $MnO_2$ for best adherence to the substrate metal.

Cover coats require less strict matching of thermal expansion coefficients. They may be used if their coefficients are within $10 \times 10^{-7}$ units of the substrate metal. They must have the same broad maturing range as the ground coat frits and additionally a low tendency to crystallize on cooling because they are commonly cooled more slowly than the ground coats. Primarily they must have very high chemical resistance and a pleasing, glossy surface.

The frits of this invention are made by melting together oxides, carbonates, nitrates or sulfates of the indicated ingredients. No differences were seen in the frit properties starting from different compounds provided equivalent amounts were used. For example, fluorine can be introduced as NaF, NH₄F, N₂SiF₆, or PbF₂ with equivalent results provided the remainder of the composition is adjusted for the introduced cations. The melting was carried out at 1000–1300° C. and when gas evolution and reaction ceased the molten glass was discharged into water or through water cooled rolls to form the frit.

In accordance with conventional practice steel or iron requires a surface preparation prior to enamelling. The following process will suitably prepare the surface of iron or steel for enamelling:

(1) Immerse metal in hot chromic acid-sulfuric acid mixture.
(2) Rinse with tap water.
(3) Immerse in 7% H₂SO₄ at 70° C. for five minutes to deoxidize.
(4) Rinse with tap water.
(5) Dip metal in nickel sulfate solution to aid adherence; 3 oz. per gal. NiSO₄ (pH=3); dip for 10 minutes at 70–80° C.
(6) Rinse with tap water.
(7) Neutralize in 1 oz. per gal. NaOH at room temperature.
(8) Rinse with tap water.
(9) Dry thoroughly.

The frit is incorporated in a slip for application to an iron or steel surface by comminution in a ball or pebble mill with the addition of a suitable vehicle, water, pigments and possibly other addition agents. A small amount of methyl or ethyl alcohol, glycol or other water-soluble organic compound may be added to the mill batch to increase or decrease the drying rate of the resulting slip. Anti-tearing agents may be added to the slip to minimize adhesion failures in the heating-up stage of firing, however, in general such agents are not essential. As anti-tearing agents may be mentioned the alkali metaborate-alkali silicate mixtures of Dayrup Patent No. 2,653,877, borax, sodium silicate, urea and NaF. Setting-up agents to promote fast elimination of fluidity upon drying coated surface, for example, bentonite may also be added. As coloring pigments metal oxides, for example, TiO₂, cobalt aluminate ZrO₂, iron oxide, cadmium sulfaselenide and the like may be added as mill addition agents. The slips are applied to the iron or steel, or in the case of cover coats on the ground coat of enamel, by dipping, brushing, painting, spraying or in any other desired manner. After application of the slip, the coated pieces are dried, either at room temperature or in a drying oven at a temperature of 80 to 120° C. The dried pieces are then placed in a suitable firing furnace (lehr) and fired for sufficient time to develop optimum gloss (2–60 min. at 490–690° C.)

The following examples are given to illustrate certain preferred enamel ground coat and cover coat compositions and preferred methods of operation. These examples are not to be considered as limiting the invention to the details therein set forth.

Nine examples of suitable ground coat frits of this invention are tabulated as Examples 1 to 9, inclusive in Tables I and II below, Table I giving the percentages of constituents in mol percent and Table II in weight percent.

TABLE I

*Ground coats, mol percent*

| Example No. | 1 | 2 | 3 | 4 | 5 | 6 | 7 | 8 | 9 |
|---|---|---|---|---|---|---|---|---|---|
| $SiO_2$ | 27.4 | 27.1 | 27.5 | 27.8 | 27.0 | 28.6 | 29.1 | 29.2 | 27.8 |
| $B_2O_3$ | 22.4 | 22.3 | 22.7 | 23.2 | 27.7 | 23.5 | 25.9 | 24.0 | 22.9 |
| $TiO_2$ | 10.6 | 10.6 | 10.8 | 10.9 | 10.5 | 11.5 | 7.6 | 11.4 | 11.2 |
| $Na_2O$ | 18.0 | 17.5 | 16.7 | 19.4 | 18.7 | 17.7 | 18.4 | 22.5 | 17.6 |
| $K_2O$ | 2.1 | 2.1 | 0.7 | 2.1 | 2.1 | 0.8 | 1.4 | 1.5 | 2.1 |
| $Li_2O$ | 11.0 | 11.0 | 12.0 | 11.2 | 10.8 | 11.4 | 11.2 | 4.7 | 10.8 |
| $BaO$ | 2.7 | 2.7 | 2.3 | 2.9 | | 2.9 | 3.8 | 3.9 | 2.9 |
| $Sb_2O_3$ | 0.6 | 0.6 | 0.7 | 0.7 | 0.2 | 0.7 | 0.7 | 0.7 | |
| $CoO$ | 1.3 | 1.3 | 1.3 | | 1.2 | 1.3 | 1.3 | 1.3 | 0.8 |
| $NiO$ | 0.4 | 0.4 | | 0.4 | 0.4 | 0.4 | 0.4 | 0.4 | 0.4 |
| $MnO_2$ | 0.4 | 0.4 | | 0.4 | 0.4 | | 0.4 | 0.4 | 0.4 |
| $PbO$ | | | 1.2 | | 1.0 | 1.2 | | | |
| $F_2$ | 3.1 | 4.0 | 4.1 | | | | | | 3.0 |
| $\frac{SiO_2 + 2TiO_2}{R_2O + PbO}$ | 1.56 | 1.61 | 1.62 | 1.52 | 1.52 | 1.66 | 1.43 | 1.81 | 1.65 |
| Sum of: $B_2O_3$, $R_2O$, PbO and $F_2$= | 56.6 | 54.9 | 57.4 | 55.9 | 60.3 | 54.6 | 56.9 | 52.7 | 56.4 |

TABLE II

*Ground coats, weight percent*

| Example No. | 1 | 2 | 3 | 4 | 5 | 6 | 7 | 8 | 9 |
|---|---|---|---|---|---|---|---|---|---|
| $SiO_2$ | 24.8 | 24.8 | 24.8 | 25.0 | 25.0 | 25.0 | 26.0 | 25.0 | 25.8 |
| $B_2O_3$ | 23.8 | 23.8 | 23.8 | 25.5 | 30.0 | 24.0 | 27.0 | 24.0 | 24.8 |
| $TiO_2$ | 12.9 | 12.9 | 12.9 | 13.0 | 13.0 | 13.5 | 9.0 | 13.0 | 13.9 |
| $Na_2O$ | 16.9 | 16.5 | 15.5 | 18.0 | 18.0 | 16.0 | 17.0 | 20.0 | 16.9 |
| $K_2O$ | 3.0 | 3.0 | 1.0 | 3.0 | 3.0 | 1.0 | 2.0 | 2.0 | 3.0 |
| $Li_2O$ | 5.0 | 5.0 | 6.0 | 5.0 | 5.0 | 5.0 | 5.0 | 2.0 | 5.0 |
| $BaO$ | 6.3 | 6.2 | 5.2 | 6.5 | | 6.5 | 8.5 | 8.5 | 6.8 |
| $Sb_2O_3$ | 3.0 | 3.0 | 3.0 | 3.0 | 1.0 | 3.0 | 3.0 | 3.0 | |
| $CoO$ | 1.5 | 1.5 | 1.5 | | 1.5 | 1.5 | 1.5 | 1.5 | 1.0 |
| $NiO$ | 0.5 | 0.5 | | 0.5 | 0.5 | 0.5 | 0.5 | 0.5 | 0.5 |
| $MnO_2$ | 0.5 | 0.5 | | 0.5 | 0.5 | | 0.5 | 0.5 | 0.5 |
| $PbO$ | | | 4.0 | | 2.5 | 4.0 | | | |
| $ZnO$ | | | | | | | | | |
| $F_2$ | 1.8 | 2.3 | 2.3 | | | | | | 1.8 |
| Sum of: $B_2O_3$, $R_2O$, PbO and $F_2$ | 50.5 | 50.6 | 52.6 | 51.5 | 58.5 | 50.0 | 51.0 | 48.0 | 51.5 |

Nine examples of suitable cover coat frits of this invention are tabulated as Examples 10 to 18 inclusive in Tables III and IV below, Table III giving the percentages of constituents in mol percent and Table IV in weight percent.

cover coat No. 13 taken from Table III. The slip was obtained by ball milling for 4 hours; 300 gm. frit, 30 gm. $TiO_2$, 120 cc. water, 1 gm. bentonite and 1 gm. borax.

TABLE III

*Cover coats, mol percent*

| Example No. | 10 | 11 | 12 | 13 | 14 | 15 | 16 | 17 | 18 |
|---|---|---|---|---|---|---|---|---|---|
| $SiO_2$ | 27.4 | 28.1 | 27.8 | 29.4 | 29.5 | 23.9 | 24.0 | 27.8 | 31.6 |
| $B_2O_3$ | 14.0 | 14.4 | 10.5 | 15.1 | 15.2 | 20.5 | 20.6 | 22.9 | 7.3 |
| $TiO_2$ | 19.6 | 20.0 | 21.7 | 15.8 | 15.9 | 13.4 | 18.0 | 12.9 | 22.0 |
| $Na_2O$ | 21.1 | 17.4 | 17.3 | 19.3 | 19.3 | 19.6 | 16.2 | 17.6 | 14.8 |
| $K_2O$ | 4.8 | 5.0 | 4.9 | 5.2 | 1.5 | 6.8 | 5.2 | 2.1 | 2.3 |
| $Li_2O$ | 8.8 | 9.0 | 9.0 | 9.4 | 11.8 | 9.5 | 9.6 | 10.8 | 11.8 |
| $BaO$ | 0.5 | 2.2 | | 5.1 | 4.6 | 4.1 | 5.7 | 2.9 | |
| $Sb_2O_3$ | 0.7 | 0.7 | 0.2 | 0.7 | 0.7 | 0.7 | 0.7 | | 0.5 |
| $ZnO$ | | | 4.2 | | | | | | |
| $PbO$ | | | 1.2 | | 1.5 | | | | 4.7 |
| $F_2$ | 3.1 | 3.2 | 3.2 | | | | | 3.0 | 5.0 |
| $CdO$ | | | | | | 1.5 | | | |
| Ratio: $\frac{SiO_2+2TiO_2}{R_2O+PbO}$ | 1.92 | 2.17 | 2.19 | 1.80 | 1.85 | 1.41 | 1.94 | 1.76 | 2.25 |
| Sum of: $B_2O_3$, $R_2O$, $PbO$ and $F_2$ | 51.8 | 49.0 | 46.1 | 49.0 | 59.3 | 56.4 | 51.6 | 56.4 | 45.9 |

TABLE IV

*Cover coats, weight percent*

| Example No. | 10 | 11 | 12 | 13 | 14 | 15 | 16 | 17 | 18 |
|---|---|---|---|---|---|---|---|---|---|
| $SiO_2$ | 24.8 | 24.8 | 24.7 | 25.0 | 25.0 | 20.0 | 20.0 | 25.8 | 27.0 |
| $B_2O_3$ | 14.9 | 14.9 | 10.9 | 15.0 | 15.0 | 20.0 | 20.0 | 24.9 | 7.2 |
| $TiO_2$ | 23.8 | 23.8 | 25.8 | 18.0 | 18.0 | 15.0 | 20.0 | 15.9 | 25.0 |
| $Na_2O$ | 19.8 | 15.9 | 15.9 | 17.0 | 17.0 | 17.0 | 14.0 | 16.9 | 13.0 |
| $K_2O$ | 6.9 | 6.9 | 6.9 | 7.0 | 2.0 | 9.0 | 7.0 | 3.0 | 3.0 |
| $Li_2O$ | 4.0 | 4.0 | 4.0 | 4.0 | 5.0 | 4.0 | 4.0 | 5.0 | 5.0 |
| $BaO$ | 1.0 | 4.9 | | 11.0 | 10.0 | 9.0 | 12.0 | 6.8 | |
| $Sb_2O_3$ | 3.0 | 3.0 | 1.0 | 3.0 | 3.0 | 3.0 | 3.0 | | 2.0 |
| $ZnO$ | | | 5.0 | | | | | | |
| $PbO$ | | | 4.0 | | 5.0 | | | | 15.1 |
| $F_2$ | 1.8 | 1.8 | 1.8 | | | | | 1.8 | 2.7 |
| $CdO$ | | | | | | 3.0 | | | |
| Sum of: $B_2O_3$, $Na_2O$, $K_2O$, twice $Li_2O$, $PbO$ and $F_2$ | 51.4 | 47.5 | 47.5 | 47.5 | 49.0 | 54.0 | 59.0 | 56.6 | 51.0 |

The nine ground coat frits of Tables I and II were mixed with water and methyl alcohol in the following proportions: 300 grams frit, 120 cc. water, and 10 cc. methyl alcohol, and ball milled for a period of 2 hours in a three-quart ball mill to produce ground coat slips. Pieces of enameler's iron (supplied by Armco Steel Co.) in the form of flat test coupons 2½ x 3½ x ⅛ inches were sprayed with each of the nine ground coat slips. The sprayed wet weight of slip on each coupon was approximately 1.75 grams whereby to produce a fired thickness of enamel approximately 0.001 inch.

The pieces were allowed to air dry for 5 minutes and placed in a steam heated drying oven for 15 minutes. The so dried pieces were then fired at a temperature and time to mature the enamel with about the maximum gloss. The temperature of firing varied between 520 and 580° C. and the time between 4 and 15 minutes, the shorter time being for the higher temperature and the longer time for the lower temperature. For light laboratory pieces the firing at 540° C. for 7 minutes was considered optimum but substantially similar results are obtained at 560° C. for 4 minutes or 520° C. for 15 minutes.

In all nine ground coat enamel coatings the enamel was smooth, tightly adherent, glossy and had a high chemical resistance.

The ground coat enamelled coupons above described were then coated with a cover coat slip prepared with The slip was sprayed to coat the coupons with about 2 gms. wet weight per sample to yield a fired coating of about 0.002 inch thickness. After drying the coating as described above with reference to the ground coat slip, the coupons were fired at 540° C. for 7 minutes.

In each case the coupons exhibited excellent gloss, adherence, chemical resistance and smoothness equal to high temperature maturing steel enamels of the prior art.

Any of the above-described ground coat frits may be used with any of the cover coat frits. If desired both ground coat and cover coat frits may be first applied and the two coats fired simultaneously. Preferably, however, the ground coat is fired before application of the cover coat. Water may be used as the sole vehicle for the preparation of the frit slips, however, it may under certain circumstances be desired to add certain organic materials for this purpose. For example, methyl or ethyl alcohol, acetone, ethylene glycol, "Carbowax" waxes, resins and the like may be used as vehicles alone or in combination.

Since it is obvious that many changes and modifications can be made in the above-described details without departing from the nature and spirit of the invention, it is to be understood that the invention is not to be limited to said details except as set forth in the appended claims.

I claim:

1. The method of enamelling iron or steel which comprises applying to said metal surface a ground coat frit, maturing between 490° C. and 690° C. having the following composition:

| | Mol percent |
|---|---|
| $SiO_2$ | 27–30 |
| $B_2O_3$ | 22–28 |
| $TiO_2$ | 7–12 |
| $Na_2O$ | 16–23 |
| $K_2O$ | 0.5–3.0 |
| $Li_2O$ | 5–12 |
| $BaO$ | 0–4 |
| $Sb_2O_3$ | 0–1 |
| $CoO$ | 0–2 |
| $NiO$ | 0–1 |
| $MnO_2$ | 0–1 |
| $PbO$ | 0–2 |
| $F_2$ | 0–5 | in which the ratio $$\frac{SiO_2 + 2TiO_2}{R_2O + PbO} = 1.4 \text{ to } 1.9$$

and the sum of $B_2O_3$, $R_2O$, $PbO$ and $F_2 = 52$–$58$ mol percent, firing said frit at the maturing temperature thereof, applying over said fired ground coat, a cover coat frit, maturing between 490° C. and 690° C. having the following composition:

| | Mol percent |
|---|---|
| $SiO_2$ | 23–32 |
| $B_2O_3$ | 7–23 |
| $TiO_2$ | 13–22 |
| $Na_2O$ | 15–22 |
| $K_2O$ | 1–7 |
| $Li_2O$ | 8–12 |
| $BaO$ | 0–6 |
| $Sb_2O_3$ | 0–1 |
| $ZnO$ | 0–5 |
| $PbO$ | 0–5 |
| $CdO$ | 0–2 |
| $F_2$ | 0–6 | in which $$\frac{SiO_2 + 2TiO_2}{R_2O + PbO} = 1.4 \text{ to } 2.3$$

and the sum of $B_2O_3$, $R_2O$, $PbO$ and $F_2 = 46$–$60$ mol percent, and firing said cover coat frit at the maturing temperature thereof.

2. The method of enamelling iron or steel with an enamel ground coat which comprises applying to said metal surface a ground coat frit maturing between 490° C. and 690° C. having the composition:

| | Mol percent |
|---|---|
| $SiO_2$ | 27–30 |
| $B_2O_3$ | 22–28 |
| $TiO_2$ | 7–12 |
| $Na_2O$ | 16–23 |
| $K_2O$ | 0.5–3.0 |
| $Li_2O$ | 5–12 |
| $BaO$ | 0–4 |
| $Sb_2O_3$ | 0–1 |
| $CoO$ | 0–2 |
| $NiO$ | 0–1 |
| $MnO_2$ | 0–1 |
| $PbO$ | 0–2 |
| $F_2$ | 0–5 | in which the ratio $$\frac{SiO_2 + 2TiO_2}{R_2O + PbO} = 1.4 \text{ to } 1.9$$

and the sum of $B_2O_3$, $R_2O$, $PbO$ and $F_2 = 52$–$58$ mol percent, and firing said frit at the maturing temperature thereof.

3. The method of enamelling iron and steel with an enamel cover coat which comprises applying over a ground coat enamel on said metal a cover coat frit maturing between 490° C. and 690° C. and having the composition:

| | Mol percent |
|---|---|
| $SiO_2$ | 23–32 |
| $B_2O_3$ | 7–23 |
| $TiO_2$ | 13–22 |
| $Na_2O$ | 15–22 |
| $K_2O$ | 1–7 |
| $Li_2O$ | 8–12 |
| $BaO$ | 0–6 |
| $Sb_2O_3$ | 0–1 |
| $ZnO$ | 0–5 |
| $PbO$ | 0–5 |
| $CdO$ | 0–2 |
| $F_2$ | 0–6 | in which the ratio $$\frac{SiO_2 + 2TiO_2}{R_2O + PbO} = 1.4 \text{ to } 2.3$$

and the sum of $B_2O_3$, $PbO$ and $F_2 = 46$–$60$ mol percent, and firing said frit at the maturing temperature thereof.

4. Vitreous enamelled iron or steel comprising an iron or steel surface having an enamel ground coat comprising the following composition:

| | Mol percent |
|---|---|
| $SiO_2$ | 27–30 |
| $B_2O_3$ | 22–28 |
| $TiO_2$ | 7–12 |
| $Na_2O$ | 16–23 |
| $K_2O$ | 0.5–3.0 |
| $Li_2O$ | 5–12 |
| $BaO$ | 0–4 |
| $Sb_2O_3$ | 0–1 |
| $CoO$ | 0–2 |
| $NiO$ | 0–1 |
| $MnO_2$ | 0–1 |
| $PbO$ | 0–2 |
| $F_2$ | 0–5 | in which the ratio $$\frac{SiO_2 + 2TiO_2}{R_2O + PbO} = 1.4 \text{ to } 1.9$$

and the sum of $B_2O_3$, $R_2O$, $PbO$ and $F_2 = 52$–$58$ mol percent, and an enamel cover coat comprising the following composition:

| | Mol percent |
|---|---|
| $SiO_2$ | 23–32 |
| $B_2O_3$ | 7–23 |
| $TiO_2$ | 13–22 |
| $Na_2O$ | 15–22 |
| $K_2O$ | 1–7 |
| $Li_2O$ | 8–12 |
| $BaO$ | 0–6 |
| $Sb_2O_3$ | 0–1 |
| $ZnO$ | 0–5 |
| $PbO$ | 0–5 |
| $CdO$ | 0–2 |
| $F_2$ | 0–6 | in which the ratio $$\frac{SiO_2 + 2TiO_2}{R_2O + PbO} = 1.4 \text{ to } 2.3$$

and the sum of $B_2O_3$, $PbO$ and $F_2 = 46$–$60$ mol percent.

5. Vitreous enamelled iron or steel comprising an iron or steel surface having an enamel ground coat comprising the following composition:

| | Mol percent |
|---|---|
| $SiO_2$ | 27–30 |
| $B_2O_3$ | 22–28 |
| $TiO_2$ | 7–12 |
| $Na_2O$ | 16–23 |
| $K_2O$ | 0.5–3.0 |
| $Li_2O$ | 5–12 |
| $BaO$ | 0–4 |
| $Sb_2O_3$ | 0–1 |
| $CoO$ | 0–2 |
| $NiO$ | 0–1 |
| $MnO_2$ | 0–1 |
| $PbO$ | 0–2 |
| $F_2$ | 0–5 | in which the ratio $$\frac{SiO_2 + 2TiO_2}{R_2O + PbO} = 1.4 \text{ to } 1.9$$

and the sum of $B_2O_3$, $R_2O$, $PbO$ and $F_2$=52–58 mol percent.

6. Vitreous enamelled iron or steel comprising an iron or steel surface having an enamel ground coat and an enamel cover coat comprising the following composition:

| | Mol percent |
|---|---|
| $SiO_2$ | 23–32 |
| $B_2O_3$ | 7–23 |
| $TiO_2$ | 13–22 |
| $Na_2O$ | 15–22 |
| $K_2O$ | 1–7 |
| $Li_2O$ | 8–12 |
| $BaO$ | 0–6 |
| $Sb_2O_3$ | 0–1 |
| $ZnO$ | 0–5 |
| $PbO$ | 0–5 |
| $CdO$ | 0–2 |
| $F_2$ | 0–6 | in which the ratio $$\frac{SiO_2 + 2TiO_2}{R_2O + PbO} = 1.4 \text{ to } 2.3$$

and the sum of $B_2O_3$, $PbO$ and $F_2$=46–60 mol percent.

7. A vitreous ground coat frit having a maturing temperature between 490° C. and 690° C. which will adhere to iron or steel having a linear coefficient of thermal expansion below $140 \times 10^{-7}$ which comprises

| | Mol percent |
|---|---|
| $SiO_2$ | 27–30 |
| $B_2O_3$ | 22–28 |
| $TiO_2$ | 7–12 |
| $Na_2O$ | 16–23 |
| $K_2O$ | 0.5–3.0 |
| $Li_2O$ | 5–12 |
| $BaO$ | 0–4 |
| $Sb_2O_3$ | 0–1 |
| $CoO$ | 0–2 |
| $NiO$ | 0–1 |
| $MnO_2$ | 0–1 |
| $PbO$ | 0–2 |
| $F_2$ | 0–5 | in which the ratio $$\frac{SiO_2 + 2TiO_2}{R_2O + PbO} = 1.4 \text{ to } 1.9$$

and the sum of $B_2O_3$, $R_2O$, $PbO$ and $F_2$=52–58 mol percent.

8. A vitreous cover coat frit having a maturing temperature between 490° C. and 690° C. which will adhere to a vitreous enamel ground coat on iron or steel having a linear coefficient of thermal expansion below $140 \times 10^{-7}$ which comprises

| | Mol percent |
|---|---|
| $SiO_2$ | 23–32 |
| $B_2O_3$ | 7–23 |
| $TiO_2$ | 13–22 |
| $Na_2O$ | 15–22 |
| $K_2O$ | 1–7 |
| $Li_2O$ | 8–12 |
| $BaO$ | 0–6 |
| $Sb_2O_3$ | 0–1 |
| $ZnO$ | 0–5 |
| $PbO$ | 0–5 |
| $CdO$ | 0–2 |
| $F_2$ | 0–6 | in which the ratio $$\frac{SiO_2 + 2TiO_2}{R_2O + PbO} = 1.4 \text{ to } 2.3$$

and the sum of $B_2O_3$, $PbO$ and $F_2$=46–60 mol percent.

References Cited in the file of this patent

UNITED STATES PATENTS

| 2,467,114 | Dayrup | Apr. 12, 1949 |
| 2,642,364 | Beatty et al. | June 16, 1953 |
| 2,660,531 | Fraser et al. | Nov. 24, 1953 |
| 2,702,762 | Chester | Feb. 22, 1955 |
| 2,842,458 | Fenney et al. | July 8, 1958 |